US 7,539,740 B2

(12) United States Patent
Hasunuma

(10) Patent No.: US 7,539,740 B2
(45) Date of Patent: May 26, 2009

(54) WEB SERVER MANAGING METHOD, PROGRAM AND RECORDING MEDIUM TO MONITOR OCCURRENCE OF LINK BREAKAGE

(75) Inventor: Junichi Hasunuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 719 days.

(21) Appl. No.: 10/365,431

(22) Filed: Feb. 13, 2003

(65) Prior Publication Data

US 2003/0182417 A1 Sep. 25, 2003

(30) Foreign Application Priority Data

Mar. 25, 2002 (JP) .............................. 2002-082827

(51) Int. Cl.
*G06F 15/173* (2006.01)
(52) U.S. Cl. ....................... 709/223; 709/203; 709/224; 709/225; 709/226; 709/229; 715/741; 715/742; 715/743; 713/182; 713/183; 713/184; 710/28; 710/36; 710/39
(58) Field of Classification Search ................. 709/200, 709/203, 223, 224–226, 236, 216–219; 714/47, 714/33; 713/21, 25, 31; 707/3, 10, 102, 707/104
See application file for complete search history.

(56) References Cited

U.S. PATENT DOCUMENTS 5,974,572 A * 10/1999 Weinberg et al. ............. 714/47
6,253,204 B1 * 6/2001 Glass et al. .................. 707/102
6,549,944 B1 * 4/2003 Weinberg et al. ........... 709/224
6,578,078 B1 * 6/2003 Smith et al. ................. 709/224
7,143,181 B2 * 11/2006 Koka et al. .................. 709/236

FOREIGN PATENT DOCUMENTS

JP        2000-90079       3/2000
JP        2001-344284      12/2001

OTHER PUBLICATIONS

Takao Takahashi, Getting Management Know-How!, Web Server Maintenance, vol. 5, Linux World, Japan, IDG Japan, Inc., Nov. 1, 2001, vol. 5, No. 11, pp. 118-121.
Office Action issued in corresponding Japanese Patent Application No. 2002-082827, mailed on Dec. 4, 2007.

* cited by examiner

*Primary Examiner*—Jude J Jean Gilles
(74) *Attorney, Agent, or Firm*—Staas & Halsey LLP

(57) ABSTRACT

The management apparatus of web servers of the present invention monitors occurrence of link breakage set by requesting to other sites. For this purpose, log information resulting from an access from an external web site to HTTP contents is acquired from the web server. Then, refer information is generated by extracting the linking relationship with the external web site to the web page from the thus acquired log information. Furthermore, upon update of the HTTP contents, the possibility of occurrence of link breakage caused by page deletion is recognized with reference to refer information, and warning is issued.

10 Claims, 16 Drawing Sheets

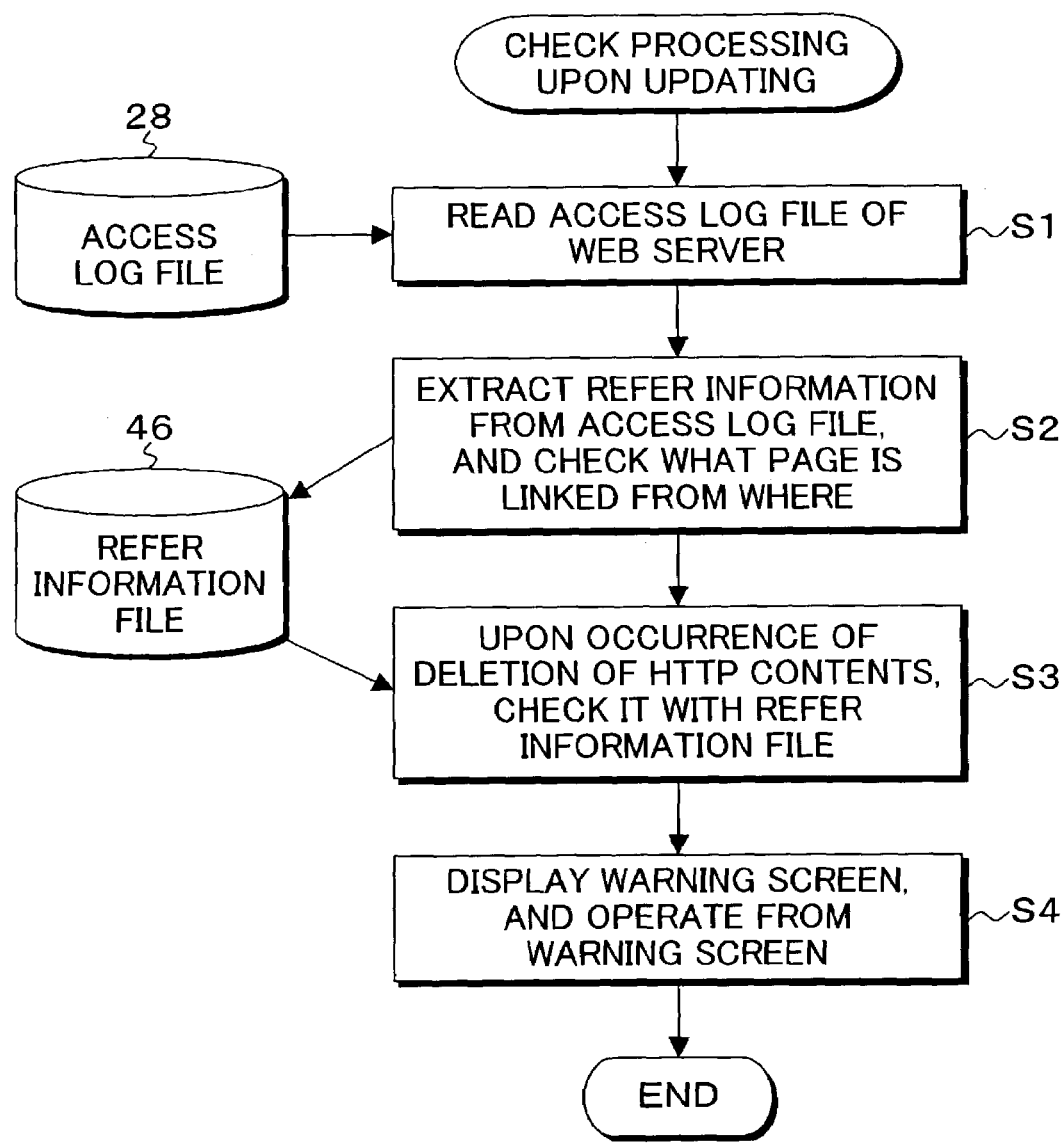

10.83.146.230--[18/Jan/2002:17:05:45+0900]"GET/manual/index.html HTTP/1.1" 200 5932
10.83.146.230--[18/Jan/2002:17:05:45+0900]"GET/manual/index.html HTTP/1.1" 200 5932 "http://mrd04/" "Mozilla/4.0 (compatible; MSIE 5.01;Windows NT)"
10.83.146.230 - - [18/Jan/2002:17:05:45 +0900] "GET /manual/images/apache_header.gif HTTP/1.1" 200 4084
10.83.146.230 - - [18/Jan/2002:17:05:45 +0900] "GET /manual/images/apache_header.gif HTTP/1.1" 200 4084 "http://mrd04/manual/index.html" "Mozilla/4.0 (compatible;MSIE 5.01;Windows NT)"
10.83.146.230 - - [18/Jan/2002:17:05:45 +0900] "GET /manual/images/pixel.gif HTTP/1.1" 200 61
10.83.146.230 - - [18/Jan/2002:17:05:45 +0900] "GET /manual/images/pixel.gif HTTP/1.1" 200 61 "http://mrd04/manual/index.html" "Mozilla/4.0 (compatible; MSIE 5.01; Windows NT)"
10.83.146.230 - - [18/Jan/2002:17:05:46 +0900] "GET /manual/images/index.gif HTTP/1.1" 200 1540
10.83.146.230 - - [18/Jan/2002:17:05:46 +0900] "GET /manual/images/index.gif HTTP/1.1" 200 1540 "http://mrd04/manual/index.html" "Mozilla/4.0(compatible;MSIE 5.01; Windows NT)"
10.83.146.230 - - [18/Jan/2002:17:05:47 +0900] "GET /manual/configuring.html HTTP/1.1" 200 11971
10.83.146.230 - - [18/Jan/2002:17:05:47 +0900] "GET /manual/configuring.html HTTP/1.1" 200 11971 "http://mrd04/manual/index.html" "Mozilla/4.0(compatible;MSIE 5.01; Windows NT)"
10.83.146.230 - - [18/Jan/2002:17:05:47 +0900] "GET /manual/images/sub.gif HTTP/1.1" 200 6083
10.83.146.230 - - [18/Jan/2002:17:05:47 +0900] "GET /manual/images/sub.gif HTTP/1.1" 200 6083 "http://mrd04/manual/configuring.html" "Mozilla/4.0 (compatible; MSIE 5.01; Windows NT)"
10.83.146.230 - - [18/Jan/2002:17:05:50 +0900] "GET/manual/mod/core.html HTTP/1.1" 200 156882
10.83.146.230 - - [18/Jan/2002:17:05:50 +0900] "GET/manual/mod/core.html HTTP/1.1" 200 156882 "http://mrd04/manual/configuring.html" "Mozilla/4.0 (compatible; MSIE 5.01; Windows NT)"
10.83.146.230 - - [18/Jan/2002:17:05:50 +0900] "GET /manual/images/home.gif HTTP/1.1" 200 1465

10.83.146.230--[18/Jan/2002:17:05:53 +0900]"GET/nasi.html HTTP/1.1"
404 297"http://gprd7/projectweb/jnc/"
"Mozilla/4.0(compatible;MSIE 5.01;WindowsNT)"

| ACCESSED PAGE | ACCESSING URL |
|---|---|
| /nasi.html HTTP/1.1 | http://gprd7/projectweb/jnc/ |
| | |

FIG. 8

```
DOCUMENT_ROOT   /virtual/210.150.240.250/home
GATEWAY_INTERFACE   CGI/1.1
HTTP_ACCEPT   */*
HTTP_ACCEPT_ENCODING   gzip, deflate
HTTP_ACCEPT_LANGUAGE   ja
HTTP_CONNECTION   keep-alive
HTTP_HOST   www.futomi.com
HTTP_REFERER   http://www.futomi.com/lecture/env_var/
HTTP_USER-AGENT   Mozilla/4.0 (compatible;MSIE 5.01; Windows NT 5.0)
HTTP_X_FORWARDED_FOR   10.83.146.44, 10.83.253.200
PATH   /bin:/usr/bin:/usr/local/bin
QUERY_STRING   REMOTE_ADDR   192.51.44.10   REMOTE_PORT   33730
REQUEST_METHOD   GET
REQUEST_URI   /cgi-bin/env_var/your_env.cgi
SCRIPT_FILENAME   /virtual/210.150.240.250/cgi-bin/env_var/your_env.cgi
SCRIPT_NAME   /cgi-bin/env_var/your_env.cgi
SERVER_ADDR   210.150.240.250
SERVER_ADMIN   admin@futomi.com
SERVER_NAME   futomi.com
SERVER_PORT   80
SERVER_PROTOCOL   HTTP/1.0
SERVER_SOFTWARE   Apache/1.3.20(Unix)
```

TO : SITE MANAGER

THANK YOU FOR YOUR REQUEST FOR OUR SERVICES. THIS IS AA BB.

THE FOLLOWING LINKAGE IS ESTABLISHED BETWEEN YOUR SITE PAGES AND OURS.
www.sony.com/fujitsu/seihin.html → www.fujitsu.com/fmworld/fmv/990101.html THE ABOVE PAGE(S) WILL BE DELETED ALONG WITH PRESENT WEB MODIFICATION.
DO NOT FAIL TO CORRECT YOUR SITE.

--- webmastrt@fujitsu.com

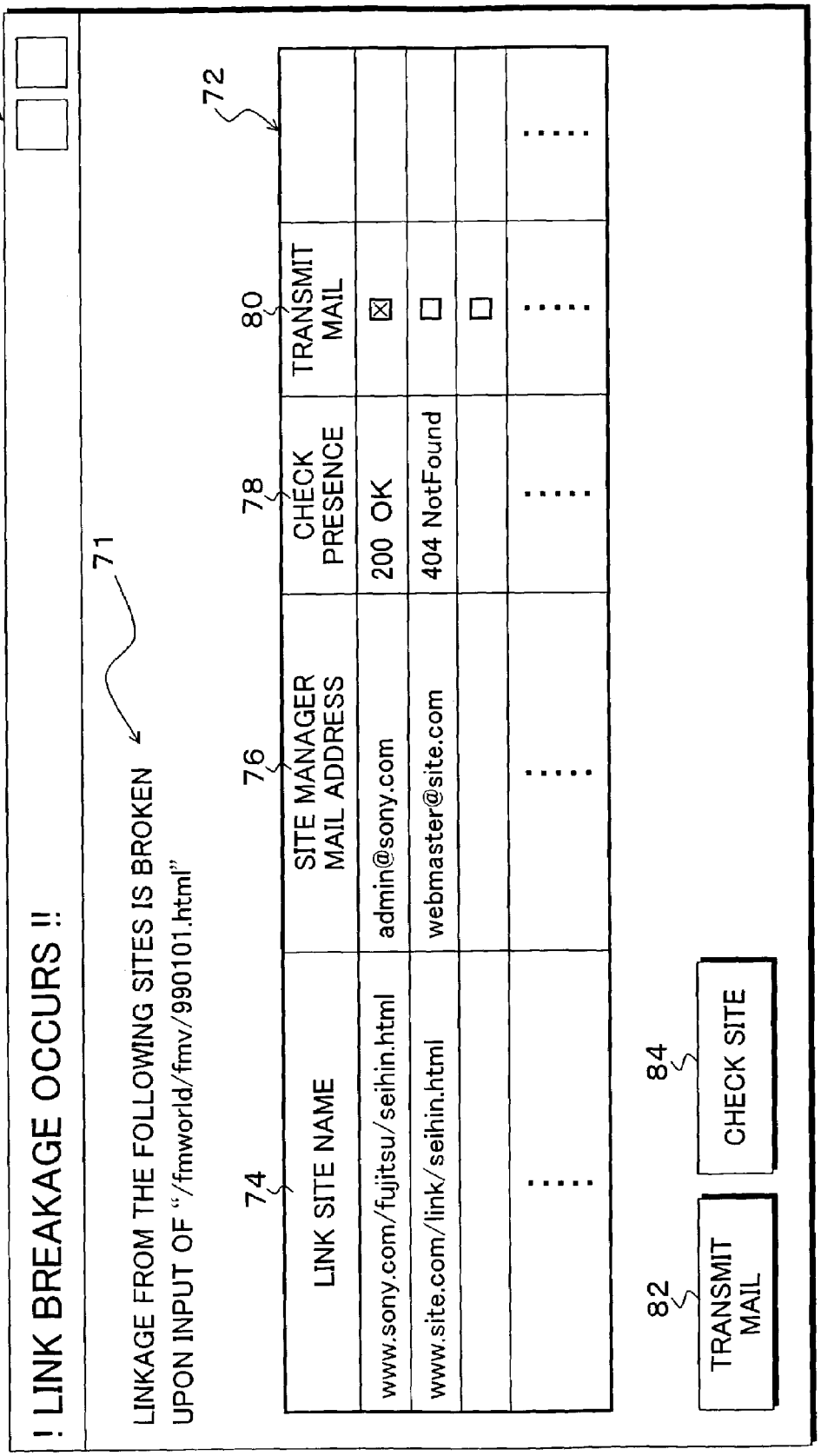

TO : SITE MANAGER

THANK YOU FOR YOUR REQUEST FOR OUR SERVICES. THIS IS AA BB.

THE FOLLOWING LINKAGE IS ESTABLISHED BETWEEN YOUR SITE PAGES AND OURS.
www.sony.com/fujitsu/seihin.html → www.fujitsu.com/fmworld/fmv/990101.html THE ABOVE PAGE(S) WAS DELETED ALONG WITH THE PRESENT WEB MODIFICATION, RESULTING IN LINK BREAKAGE. DO NOT FAIL TO CORRECT YOUR SITE.

webmastrt@fujitsu.com

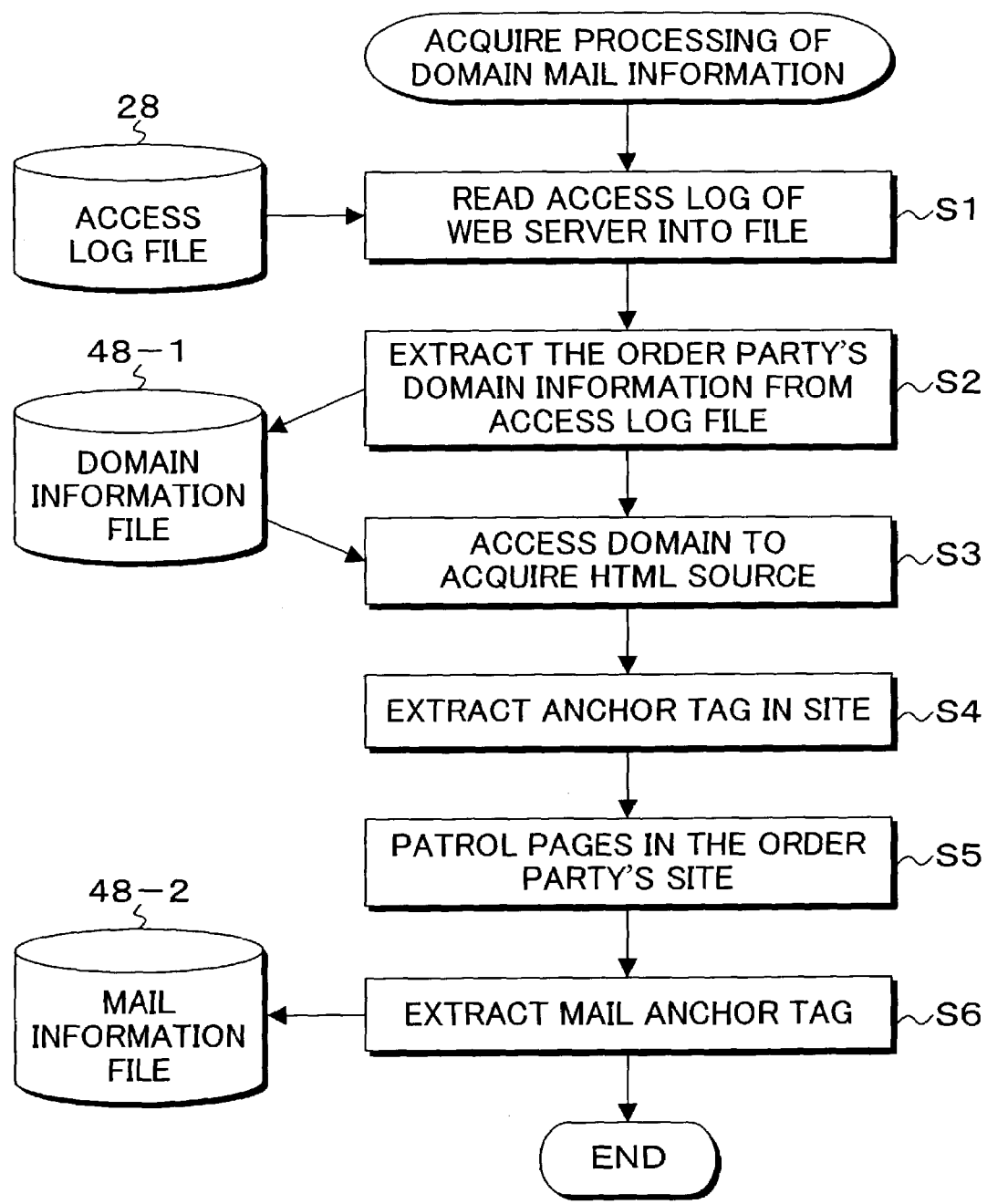

[HTML SOURCE]

<HTML>
<head><LINK TESTING PAGE OF title MAIL></title></head>
<BODY>
<H2>THE OTHER PARTY OF LINK</H2>
98 → <a href="/link/link.html">THE OTHER PARTY OF LINK</a>
<H2>MANAGER MAIL</H2><hr>
<a href="mailto:hasu@jp.fujitsu.com">hasu@jp.fujitsu.com</a>
<hr></body>
</html>

| LINKING PARTY'S DOMAIN INFORMATION | SITE MANAGER MAIL INFORMATION |
|---|---|
| www.sony.com/fujitsu/seihin.html | admin@sony.com |
| www.site.com/link/seihin.html | webmaster@site.com |
| | |

WEB SERVER MANAGING METHOD, PROGRAM AND RECORDING MEDIUM TO MONITOR OCCURRENCE OF LINK BREAKAGE

BACKGROUND OF THE INVENTION

1. Field of the Invention

The present invention relates to a web server managing method, program and recording medium, which manage linkage of HTTP contents of own site requested to an external web site. More particularly, the invention relates to a web server managing method, program and recording medium for monitoring occurrence of a link breakage with an external web site caused by page deletion resulting from web site updating.

2. Description of the Related Arts

Importance of public relations activities through internet is increasing at present among corporate activities. The most important among public relations activities through internet is linkage from other sites. Particularly, advertising rates are paid for linkage from various portal sites and famous sites.

However, when page deletion takes place upon up dating the own site while managing the site by requesting another site to set a link, the link of such setting is requested to the other site may be broken. Occurrence of a link breakage leads to loss of business chances, a decrease in customers' satisfaction and waste of advertising cost, which are considered to result in serious corporate damages. Occurrence of a link breakage in an own site can usually be checked by carrying out link checking function mounted on a homepage preparing tool or the like. For a link from another site, however, it is the only present practice to sum up server logs to find the corresponding log and correct a page in the own site, or to ask the manager of the other site to correct the breakage. In usual management, therefore, the user cannot realize the link breakage from the other site occurring during update. This causes a problem in that the link breakage is left uncorrected for a long period of time, which may lead to loss of business chances.

SUMMARY OF THE INVENTION

According to the present invention, there are provided a web server managing method, program and recording medium which permit monitoring of a link set by requesting to other site to properly correct link breakage.

The invention provides a web server managing method comprising:

a log acquiring step of acquiring log information resulting from an access from an external web site to HTTP contents from a web server;

a refer information generating step of generating refer information by extracting linking relationship between the web page and the external web site from the acquired log information; and a warning step of recognizing the possibility of occurrence of a link breakage caused by deletion of a page with reference to the refer information upon updating the HTTP contents. According to the present invention, as described above, the manager can easily find the link breakage, without following a complicated artificial procedure of analyzing an access log, by issuing a warning against the link breakage through collation with the log upon updating the web site. In the log acquiring step in this web server managing method, a log file of the web server and/or a CGI environment variable is acquired, and in the refer information generating step, refer information is generated by extracting a linking relationship between the web page and the external web server from the log file and/or the CGI environment variable. An embodiment of this managing method further comprises a mail information generating step of generating mail information by extracting a manager mail address of an external web site having a linking relationship from the log information of the web server; wherein the warning step, when the link breakage is caused by the page deletion upon updating, of transmitting previously an electronic mail for correction request of the site to the manager mail address selected from the mail information. According to the method of the invention, mail information of the manager of the other site is acquired to request correction of the link breakage by mail. It is not therefore necessary to investigate the mail address of the link requesting party for correction, thus alleviating the burden on the manager. The warning step causes display of a warning screen containing the name of an external web site suffering from the link breakage, the site manager mail address, an operating button indicating the propriety of page deletion, and a mail transmitting button. In the warning step, the warning screen contains a site check button which checks presence or absence of a linking party's page in the external web site, and displays the result thereof.

Another embodiment of the web server managing method of the present invention comprises a log acquiring step of acquiring, from a web screen, information resulting from anaccess to HTTP contents from an external web server;

a refer information generating step of generating link information by extracting, from the acquired log information, the linking relationship between the web page and the external web server, and detecting a no-page error code; and a warning step, upon detection of the no-page error code, of recognizing a web page suffering from a link breakage with reference to said refer information, and issuing a warning to that effect. According to the present invention, as described above, when page deletion has already been carried out upon updating the web site, the manager can easily find the link breakage, without following a complicated artificial procedure of analyzing an access log, by detecting a no-page error code for the access from the other site from the long, and issuing a warning against link breakage. The log acquiring step comprises acquiring a log file of the web server and/or a CGI environment variable; and that the refer information generating step comprises generating the refer information by extracting the linking relationship between the web page and the external web server from the log file and/or the CGI environment variable, and detecting an error code 404. This embodiment further comprises a mail information generating step of generating mail information by extracting a manager mail address of the external web site having a linking relationship from the log information of the web server; wherein the warning step comprises transmitting, when a no-page error code is detected, an electronic mail for requesting correction of the site to the manager mail address selected from the mail information. The warning step comprises causing display of a warning screen having the name of the external web site suffering from link breakage, the main address of the site manager, and a mail transmitting button. In the warning step, the warning screen contains a site check button which checks presence or absence of a linking party's page in the external web site, and displays the result thereof.

The present invention provides a program to be executed by a computer serving as a web managing apparatus provided for the web server. This program causes the computer to execute:

a log acquiring step of acquiring log information resulting from an access from an external web site to HTTP contents from the web server;

a refer information generating step of generating refer information by extracting linking relationship between the web page and the external web site from the acquired log information;

a mail information generating step of generating mail information by extracting the manager mail address of the external web site having the linking relationship from the log information of the web server; and a warning step of recognizing the possibility of occurrence of a link breakage caused by deletion of a page with reference to the refer information upon updating the HTTP contents, and at the same time, previously transmitting an electronic mail for requesting correction of the site to the manager mail address selected from the mail information.

The present invention provides another embodiment of the program of the invention, which causes a computer serving as a web managing apparatus installed for the web server to execute:

a log acquiring step of acquiring log information resulting from an access from an external web side to HTTP contents from the web server;

a refer information generating step of generating link information by extracting, from the acquired log information, the linking relationship between the web page and the external web server, and detecting a no-page code; a mail information generating step of generating mail information by extracting a manager mail address of the external web site having a linking relationship from the log information of the web server; and a warning step of, upon detection of the no-page error code, recognizing a web page suffering from a link breakage with reference to the refer information to issue a warning thereto, and at the same time, transmitting an electronic mail to request correction of the site to the manager mail address selected from the mail information.

The present invention provides a machine-readable recording medium storing the program to be executed by a computer serving as a web managing apparatus installed for the web server. This recording medium causes the computer to execute:

a log acquiring step of acquiring log information resulting from an access from an external web site to HTTP contents from a web server;

a refer information generating step of generating refer information by extracting linking relationship between the web page and the external web site from the acquired log information;

a mail information generating step of generating mail information by extracting a manager mail address of an external web site having a linking relationship from the log information of the web server; and a warning step of recognizing the possibility of occurrence of a link breakage caused by deletion of a page with reference to the refer information upon updating the HTTP contents, and at the same time, previously transmitting electronic mail for requesting correction of the site to the manager mail address selected from the mail information.

The present invention provides another embodiment of the recording medium of the invention, which stores a program for causing a computer to execute:

a log acquiring step of acquiring log information resulting from an access from an external web side to HTTP contents from a web server;

a refer information generating step of generating link information by extracting the linking relationship between a web page and an external web server from said acquired log information, and detecting a no-page error code;

a mail information generating step of generating mail information by extracting, from the log information of the web server, a manager mail address of an external web site having the linking relationship; and warning step of recognizing, upon detection of the no-page error code, a web page suffering from link breakage with reference to the refer information to issue a warning, and transmitting electronic mail to request correction of the site to the manager mail address selected from the mail information. The details of the program and the recording medium are substantially the same as those of the web server managing method.

The above and other objects, features, and advantages of the present invention will become more apparent from the following detailed description with reference to the drawings.

The above and other objects, features, and advantages of the present invention will become more apparent from the following detailed description with reference to the drawings.

BREIEF DESCRIPTION OF THE DRAWINGS

FIG. 4 is a flowchart of details of check processing upon updating of FIG. 3;

FIG. 5 is a descriptive view of a concrete example of an access log sampled by the web server;

FIG. 6 is a descriptive view of an access log upon occurrence of a link breakage;

FIG. 7 is a descriptive view of a refer information file generated from an access log in the invention;

FIG. 8 is a descriptive view of the CGI environment variable used for generating refer information in the invention;

FIG. 10 is a descriptive view of mail transmission contents using the link breakage warning screen of FIG. 9;

FIG. 12 is a descriptive view of a warning screen used for the checking process shown in FIG. 11;

FIG. 13 is a descriptive view of mail transmission contents using the link breakage warning screen shown in FIG. 12;

FIG. 14 is a flowchart of details of the manager mail information acquiring process shown in FIG. 3;

FIG. 15 is a descriptive view of domain information and mail information generated in the invention; and FIG. 16 is a descriptive view of an HTML source acquired by accessing other sites in the process shown in FIG. 15.

DETAILED DESCRIPTION OF THE PREFERRED EMBODIMENT

Figure 1A:
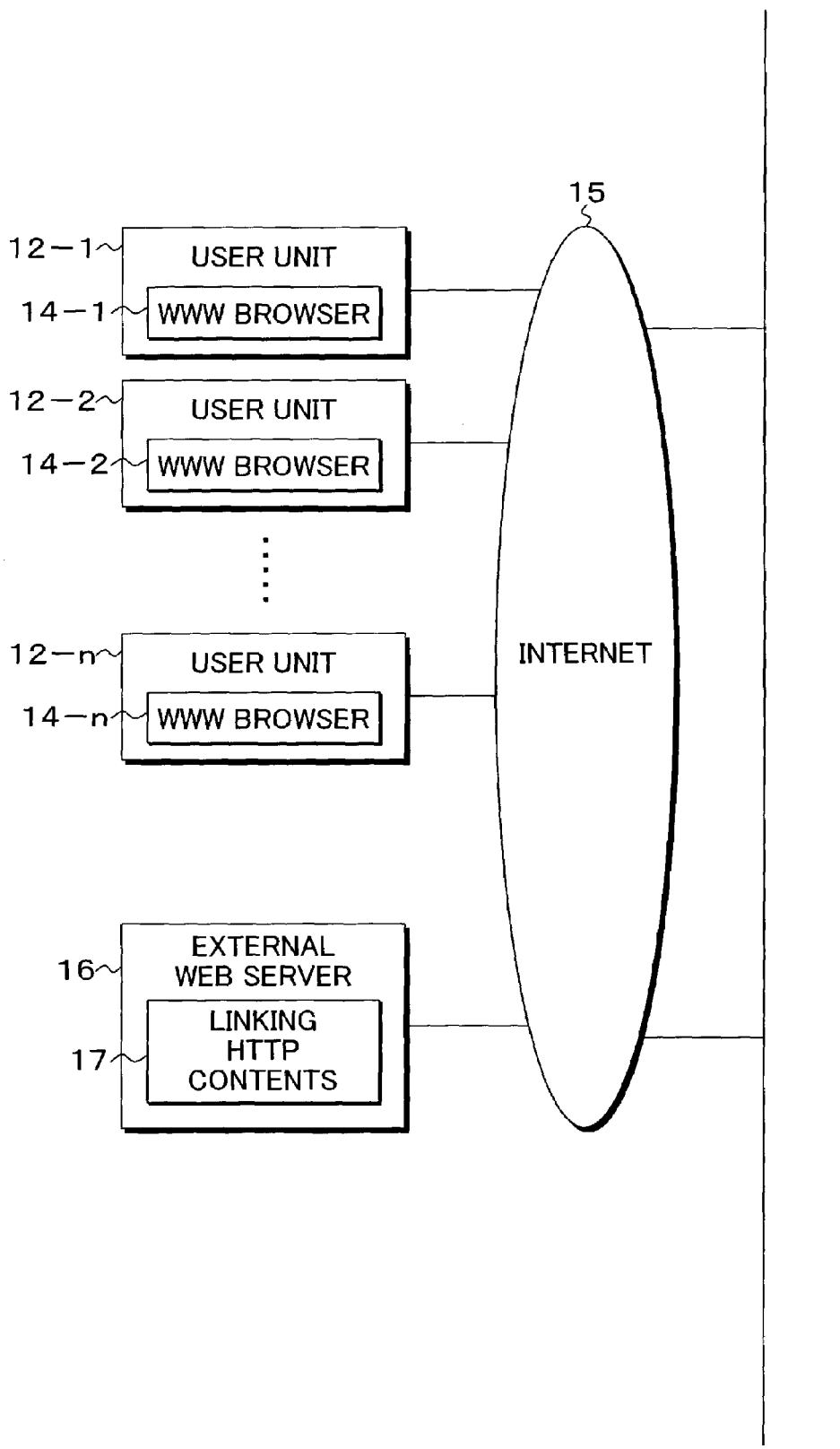
FIGS. 1A and 1B are a block diagram of a system configuration to which the present invention is applied.
Figure 1B:
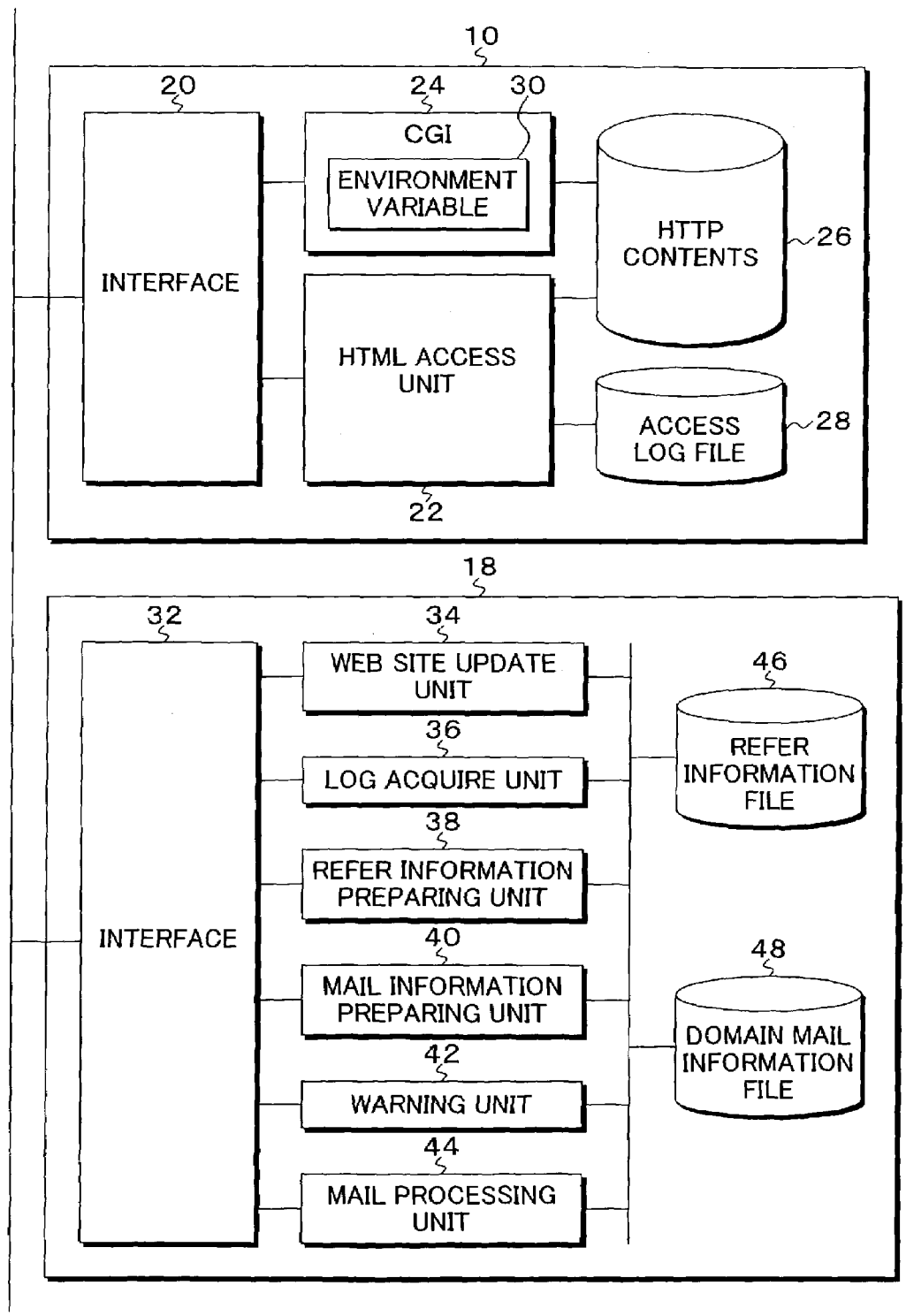

FIGS. 1A and 1B are a block diagram of a system configuration to which the web server managing method of the present invention is applied. User units 12-1 to 12-n such as personal computers are connected to a web server 10 to be managed via internet 15. Contents of the web server 10 are perusable on request from any of www browsers 14-1 to 14-n provided on the individual user units 12-1 to 12-n. An external web server 16 which requests setting of links to the contents of the web server 10 is also connected to the internet 15. A request to the web server 10 which takes the part of a linking party is made by any of the www browsers 14-1 to 14-n which requests and peruses the contents 17 of the linking HTTP provided in the external web server 16, and by clicking the link set during perusal. An HTTP interface 20, an HTML access unit 22, a CGI 24, an HTTP content 26, and an access log file 28 are provided in the web server 10. An environment variable 30 is provided in the CGI 24. A main function of the web server 10 is to transmit the file of the HTTP content 26 corresponding to the URL requested by any of the www browsers 14-1 to 14-n. Requests from the www browsers 14-1 to 14-n include HTML requests and requests by the CGI program. The HTML request is given to the HTML access unit 22, reads out a file from the HTTP content 26, and transmits the same. In the case of a request of CGI, the CGI program 24 is executed to fetch a file from the HTTP content, and an output from the CGI program 24 is transmitted towards the browsers. The HTML access unit 24 prepares an access log for each request received from the browsers, and stores prepared access logs in the access log file 28. In the case of Apache known as a web server, for example, access files are prepared by use of refer logs and a log file rotation, and arranged into the single access log file 28. Upon the receipt of a CGI request from any of the browsers, the web server 10 starts up the CGI program 24 after setting the environment variable 30. The environment variable 30 prepared prior to starting up the CGI program 24 contains information about the URL providing domain information of the accessing party and accessed pages. In the present invention, a web managing unit 18 is provided separately from the web server 10. The web managing unit 18 is realized by a personal computer or the like, directly connected to the web server 10, and connected also to the internet 15. The web managing unit 18 of the present invention monitors occurrence of a link breakage in accesses based on link setting requested to the external server 16 for the web server 10, and upon discovering a link breakage, issues a warning to the manager of the web site. For this purpose, a web site update unit 34, a log acquiring unit 36, a refer information preparing unit 38, a mail information preparing unit 40, a warning unit 42 and a mail processing unit 44 are provided in the web managing unit 18, in addition to the HTTP interface 32. A refer information file 46 and a domain mail information file 48 are provided to supply information for monitoring occurrence of a link breakage. The web site update unit 34 performs update such as modification, addition or deletion of the HTTP content 26 during management of the web server 10. Upon occurrence of page deletion of the HTTP content 26 as a result of update by the web site update 34, if link setting has been conducted from the external web server 16 to the deleted page, a link breakage takes place, in which the linking relationship with the external web server 16 is broken as a result of page deletion. The web managing unit 18 of the present invention monitors occurrence of a link breakage from the external web server 16 caused by page deletion resulting from update of the web site, and if a link breakage occurs upon updating, issues a warning to the manager, to cause page deletion after acknowledgement by the manager. Since page deletion may be conducted without link breakagechecking upon updating, and this may cause a link breakage for an access from the external web server 16 during management, a "404 Not Found" known as a no-page error code caused by link breakage is detected, and a warning is issued. For the purpose of monitoring such a link breakage, the log acquiring unit 36 acquires a log file stored in the access log file 28 of the web server 10. A refer information preparing unit 38 analyzes the access log acquired by a log acquiring unit 36 from the web server 10, generates refer information by extracting a linking relationship between the own web page and the external web site by the external web server 16, and stores the same in a refer information file 46. The refer information stores information about to which page of the own site has been accessed by what external URL. A mail information preparing unit 40 prepares mail information by acquiring the mail address of the manager of the external web site having a linking relationship from the access log file 28, and stores the same in the domain mail information file 48, together with the domain information which is an IP address indicating the accessing party. The warning unit 42 starts up upon updating the web server 10 by the web site update unit 34, and checks up whether or not a link breakage has bee caused by page deletion taking place upon updating. If page deletion causing a link breakage is determined to have taken place, a warning is given to the manager through a warning screen. The warning screen regarding the possibility of link breakage upon updating has an operational function permitting page deletion while recognizing a link breakage or not permitting page deletion to prevent a link breakage from occurring by prohibiting page deletion. Furthermore, the warning screen presents steps to cope with occurrence of a link breakage caused by page deletion, comprising acquiring domain information, i.e., an IP address of the external web server 16 suffering from a link breakage, from a domain mail information file 48, acquiring the mail address of the manager of the external web server suffering from the link breakage from the domain mail information file 48 at the same time, an transmitting an electronic mail to the effect tat a link breakage occurs upon page deletion resulting from update and that the user asks the site side to correct the link breakage to the manager of the external web server 16 suffering from the link breakage by means of a mailprocessing unit 44. To cope with a case where the web site has been updated without a link breakage check, the warning unit 42 performs detection of a no page error code generated in an access to the deleted page in the refer information file 46, i.e., a code No. "404" with reference to the refer information file 46 prepared from the access log file 28 during management, so as to give a warning to the manager if an error code "404" is detected. Even in the warning screen when the no-page error code "404" is detected, as described above, it is possible to acquire the manager mail address from the domain mail information file 48, and transmit an electronic mail requesting the external web site to correct the link breakage to the manager of the external web site suffering from the link breakage by means of the mail processing unit 44.

Figure 2:
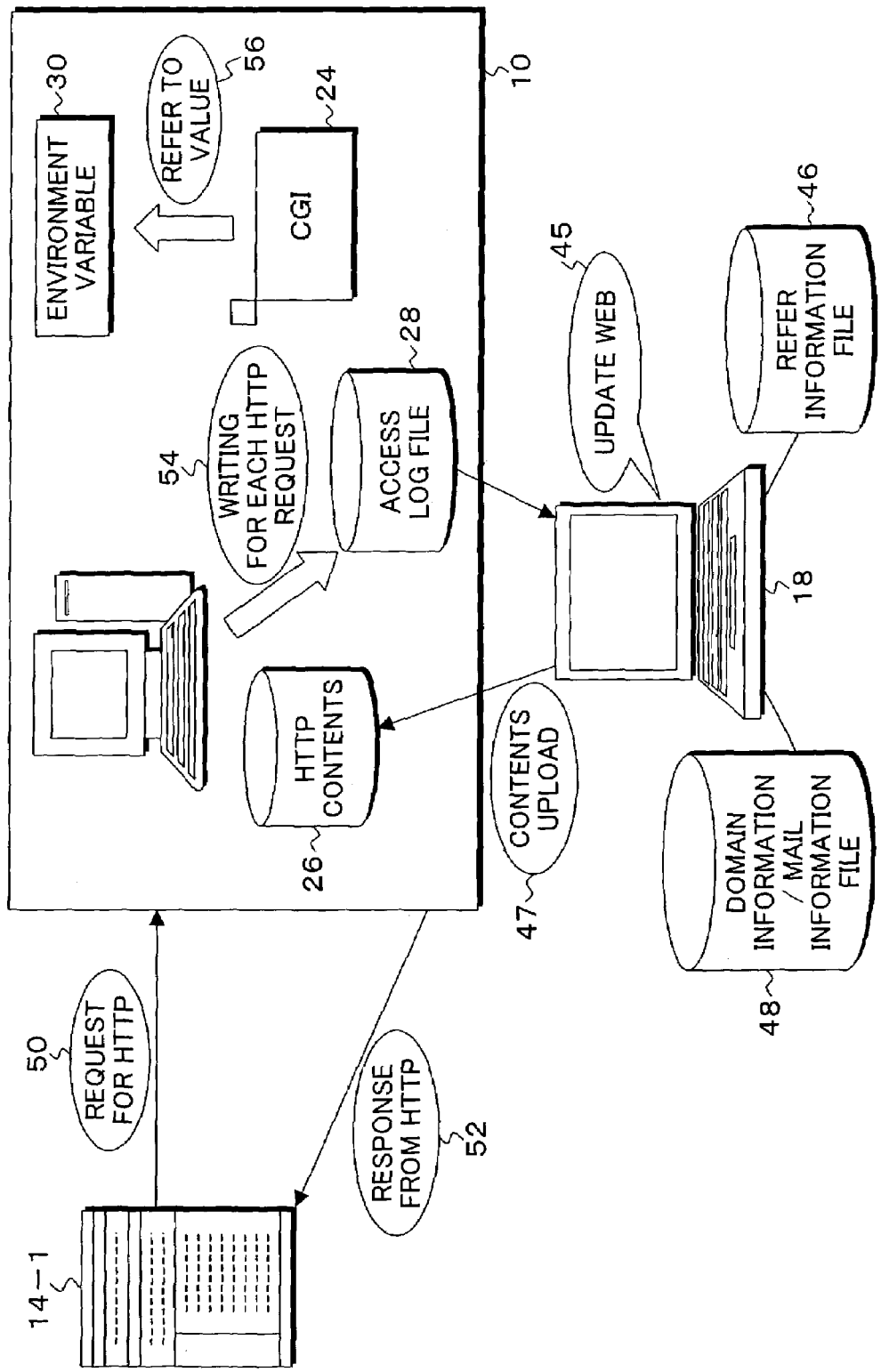
FIG. 2 is a descriptive view of the web server management according to the invention.

FIG. 2 illustrates management of the web server management processing according to the present invention. An HTTP request 50 is made from the www browser 14-1 to the web sever 10, and upon receipt of this request, acquires a corresponding web page from the HTTP content 26, and causes the www browser 14-1 to display the web page by making an HTTP response 52. For each such Http request 50 from the www browser 14-1, one access log is written 54 to the access log file 28. When the request from the www browser 14-1 is for the CGI program 24, the web server 10 first sets an environment variable 30, then starts up the CGI program 24, fetches the requested web page from the HTTP content 26, and outputs the same as an HTTP response 52 onto the browser side. When performing update 45 of the web page provided in the web server 10, the web managing unit 18 provided as an external unit of the web server 10 conducts upload 47 of the updated contents to the HTTP content 26. The contents upload 47 includes deletion of the web page in the HTTP content 26.

Upon the update 45 of the web page by the web managing unit 18, the refer information file 46 is generated from the access log file 28 of the web server 10. The relationship between a URL of the external web server serving as the linking party and the own web server page in the HTTP content 26 accessed therefrom is registered in the refer information file 46. The web managing unit 18 acquires domain information of the URL playing the part of linking party during operation of the web server 10, and with reference to the linking web page forming the domain information, acquires a manager's mail address of the external web page to store the same in the domain mail information file 48. Upon updating 45 the web page, the presence or absence of a link breakage from the external web page is checked, with reference to the refer information file 46, which may be caused by page deletion by the contents upload 47. When a link breakage is expected, a warning screen is displayed on the web managing unit 18 so as to make it possible for the manager to determine whether or not page deletion is to be performed. When page deletion causes a link breakage, domain information (IP address) and a manager mail address of the linking party are acquired from the domain mail information file 48, and an electronic mail requesting to correct the external web page is transmitted to cope with the link breakage caused by page deletion. When link breakage is not checked up upon update, the error code "404" resulting from a link breakage is monitored in the refer information file 46 obtained from the acquisition of the access log file 28, and upon detection of the error code "404", occurrence of a link breakage is determined, and the warning screen is displayed on the web managing unit 18 to inform the web manager of the fact. The warning screen has a transmitting function of an electronic mail to the manager of the external web site suffering from the link breakage.

Figure 3:
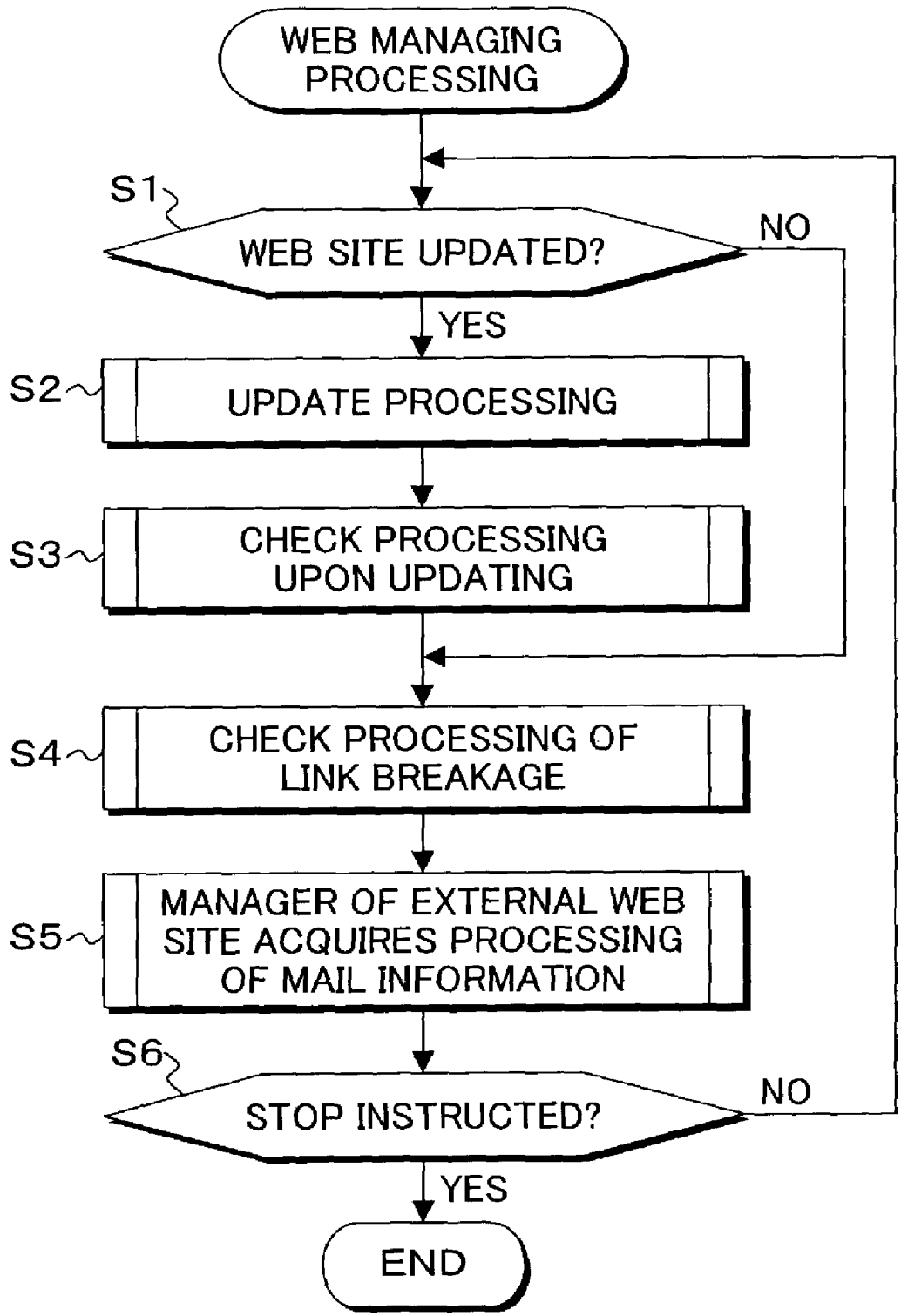
FIG. 3 is a flowchart of the web server management according to the invention.

FIG. 3 is a flowchart of the processing procedure as a whole of the web management processing of the present invention. When the update processing of the web site is determined in step S1, update work processing, i.e., contents upload is performed in step S2. Then in step S3, check processing upon update is carried out, and if the possibility of link breakage is determined, a warning is issued to the manager. On the other hand, irrespective of the web site update, a link breakage check processing is conducted for the web server in management in step S4. The link breakage check processing comprises detecting a no-page error code "404" resulting from the link breakage contained in the refer information, and warning the manager in step S5. The wave management processing of steps S1 to S5 is repeated until a stop instruction of the web management unit 18 is received.

FIG. 4 is a flowchart illustrating details of the check processing upon updating in step S3 shown in FIG. 3. In this check processing upon updating, the access log file 28 of the web server 10 is read in step S1.

FIG. 5 illustrates a concrete example of the access log file 28 prepared by the web server 10. In the case of Apache known as a web server, contents of the access log file 28 are arranged into a log for each access by use of a refer log and log file rotation.

FIG. 6 picks up an access log upon receipt of an HTTP request. "GET/nasi.html HTTP/1.1" is described as access page information 58 in the access log 28-1. The no-page error code "404" caused by a link breakage is described as error information 60. In addition, "http://gprd7/projectweb/jnc/" is described as refer information 62 indicating the accessing domain. Referring again to FIG. 4, when the access log file 28 of the web server 10 is read in step S1, refer information showing an access page and an accessing URL is read from the read access log file 28, and a refer information file 46 shown in FIG. 7 is prepared and managed.

The refer information file 46 shown in FIG. 7 has an access page and an accessing URL. In the case of the access log file 28-1 shown in FIG. 6, access page information 58 is stored in the access page, and the refer information 62 is stored in the accessing URL. This refer information file 46 can be acquired also from an environment variable 30 initialized at the request for the CGI program 24, in addition to the access log file 28 in the web server 10.

FIG. 8 illustrates an example of the environment variable 30 set prior to startup of the CGI program. In this environment variable 30, "www.futomi.com" is described as an accessing host name 64, and "http://www.futomi/lecture/env var/J" is described as an accessing IP address 66. Execution of the CGI program 24 reveals a web page transmitted as an http response to the request. Therefore, by reading the environment variable 30 for each access made prior to startup of the CGI program 24, it is possible to prepare a refer information file 46 which stores the relationship between the access page and the accessing IP address as shown in FIG. 7.

Referring to FIG. 4 again, when the refer information file 46 is prepared in step S2, then in step S3, upon occurrence of a deletion of the HTTP contents as a result of an update, collation with the refer information file 46 is performed. More specifically, the access page of the refer information file 46 as shown in FIG. 7 is retrieved on the basis of the page subjected to deletion. When a corresponding access page is retrieved, it is determined that a link breakage occurs from the accessing URL as a result of the page deletion. A warning screen is displayed in step S4, and necessary operations are performed from the warning screen.

Figure 9:
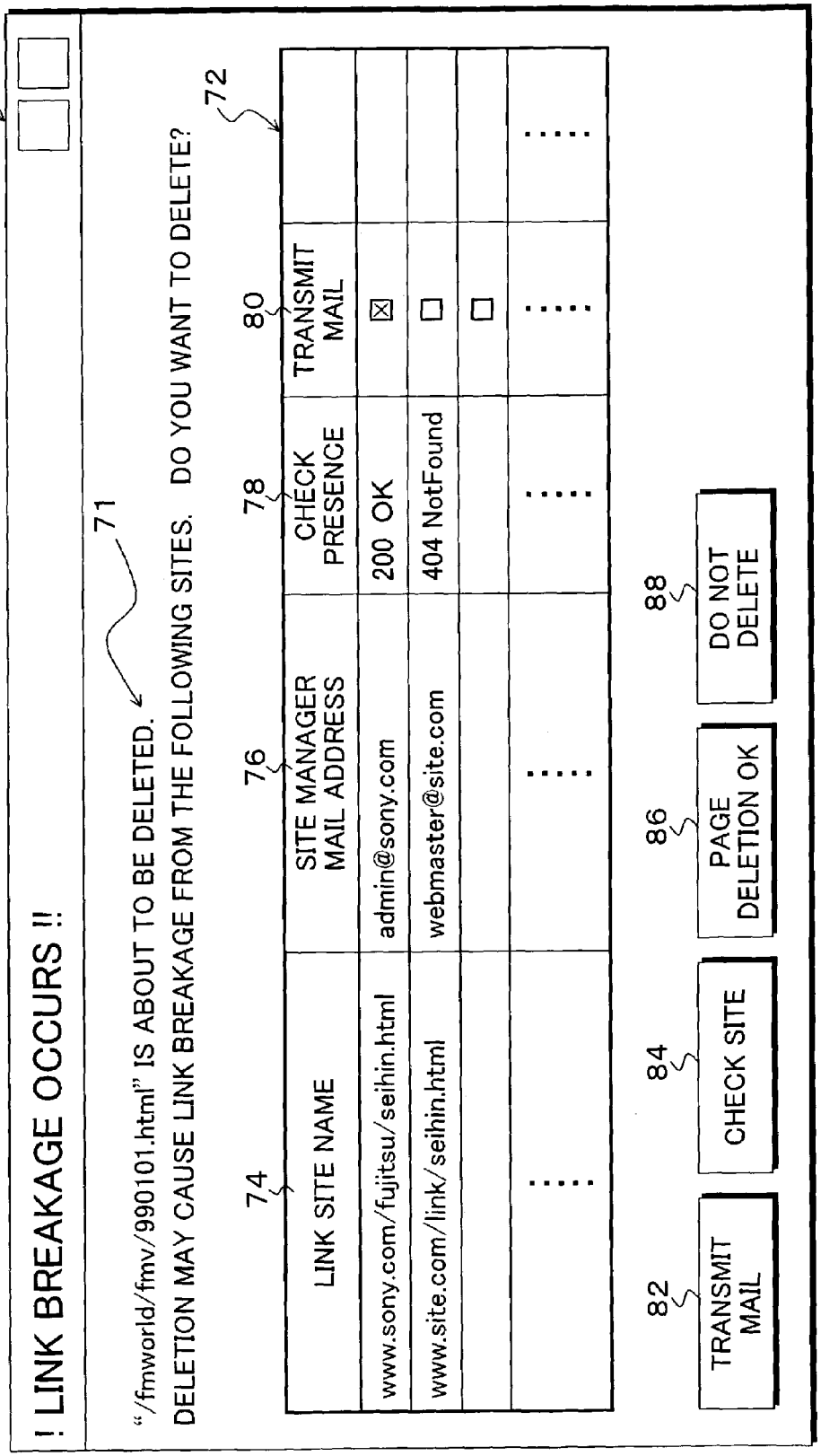
FIG. 9 is a descriptive view of a warning screen used in the link breakage checking process upon updating in FIG. 4.

FIG. 9 is a descriptive view of the warning screen 70 displayed in step S4 of FIG. 4. In this warning screen 70, "Link Breakage Occurs" is displayed as a title, and in addition, the deleted page and a message 71 announcing the occurrence of a link breakage caused by deletion are displayed. This is followed by display of a link site name 74, a site manager mail address 76, a presence check 78 and a mail transmission 80 as an information list 72 under the message 71. Under this information list 72, there are provided a mail transmission button 82, a site check button 84, a page deletion OK button 86 and a deletion stop button 88. The link site name 74 serving as a linking party in the information test 72 is available from the refer information file 46 having contents of FIG. 7. The site manager mail address 76 is available from a domain mail information file 48. The presence check 78 displays the result of a check whether or not a page having link set of the linking web site corresponding to the current link site name 74 is present. For the purpose of this presence check 78, a site check button 84 is provided. By operating the site check button 84, a request is issued to that link site name 74 in the Http protocol, and the status information is returned. If the status information is normally returned, the result of check "200 OK" having a code "200" showing the presence of the linking page is displayed as shown in the first column of the presence check 78. When there is no linking page, on the other hand, the no-page error code "404" is returned. The message "404 Not Found" is displayed as in the second column. The manager of the web site recognizes the occurrence of link breakage by watching the display of the warning screen 70 as shown in FIG. 9, and determines whether or not page deletion should be executed on this assumption. If occurrence of link breakage is allowed, a page deletion OK button 86 is operated. If occurrence of link breakage is to be avoided, a deletion stop button 88 is pressed. When page deletion is performed through upload of the web page of the linking party by operating the page deletion OK button 86, a mail is transmitted to the linking web manager. In this mail transmission, transmission check is carried out for a link site of which the presence has been confirmed by the presence check 78 in a check box of all transmission 80 of the information list 78, and then the mail transmission button 82 is operated. In this case, for a link site determined to be "no page" by the presence check 78, the check box of mail transmission is not clicked so as to avoid an unnecessary mail transmission.

FIG. 10 illustrates an example of description of a mail 90 transmitted to the manager of an external link site for which link is set by operating the mail transmission button 82 shown in FIG. 9. Link setting information of the counter-part site to the own site and a correction request for the counter-part site resulting from page deletion at the own web site are described in this mail 90.

Figure 11:
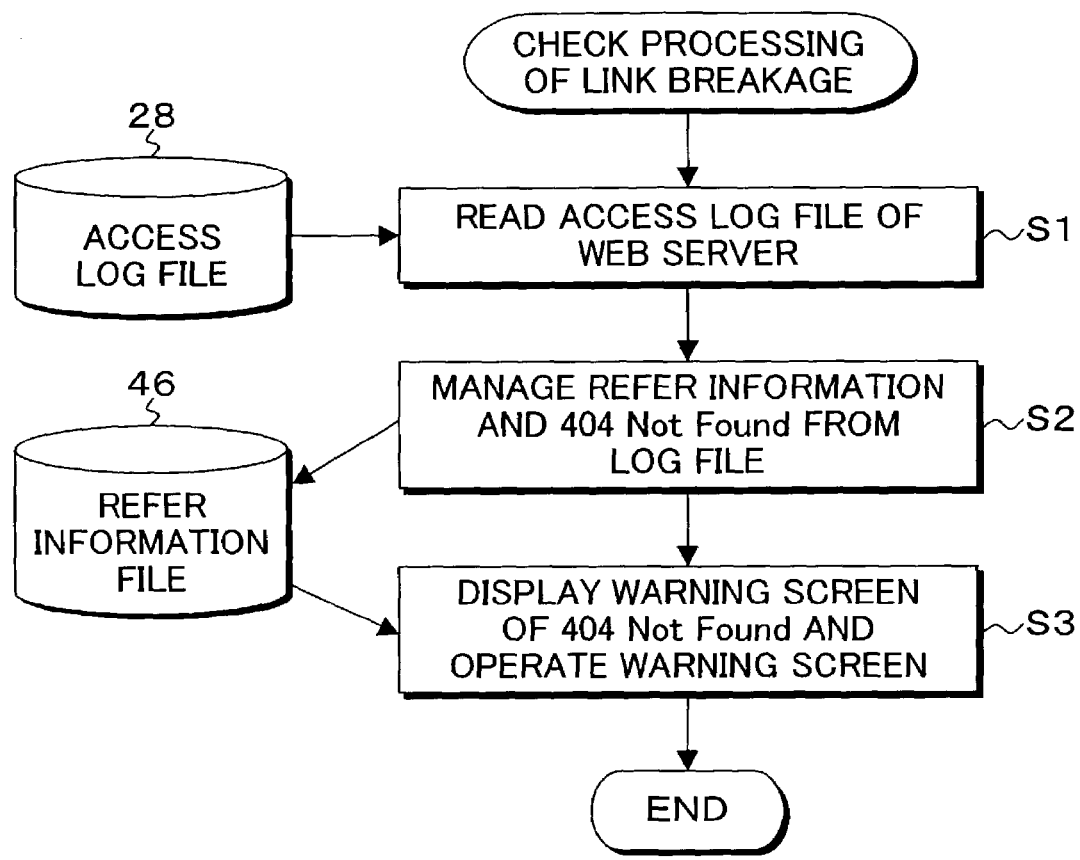
FIG. 11 is a detailed flowchart of the link breakage process giving warning by detecting a no-page error code from the access log shown in FIG. 3.

FIG. 11 is a flowchart illustrating details of link breakage check processing in step S4. In this link breakage check processing, deletion of the web page is conducted by update, without effecting link breakage check upon update of the web page, and a warning is issued to the manager by detecting link breakage during the subsequent operations. In step S1, the access log file 28 of the web server 10 is read in, and a refer information file 46 as that in FIG. 7 is generated. Upon generation of this refer information file 46, and simultaneously, the no-page error code "404 Not Found" in the access log file 28 is detected. When the error code "404 Not Found" is detected upon preparation of the refer information file 46, the warning screen is displayed in step S3, and necessary operations are performed from the warning screen.

FIG. 12 is a descriptive view of the warning screen 92 displayed in step S3. As in the warning screen 70 shown in FIG. 9 corresponding to link breakage upon update, this warning screen 92 displays a title "Link Breakage Occurs", followed by the description of the link breakage from the site of the information list 72 on the page of the own web site. The information list 72 is the same as the warning screen 70 shown in FIG. 9, having a link site name 74, a site manager mail address 76, a presence check 78 and a mail transmission 80. Under the information list 72, a mail transmission button 82 and a site check button 84 are provided. Since this warning screen 92 is separated from update of the web contents, a page deletion OK button or a deletion stop button, as in the warning screen shown in FIG. 9, is omitted.

FIG. 13 illustrates contents of the mail 94 in a case where, in the check box of the mail transmission 80 of the information list 72, a link site containing the linking page is selected with a result of the presence check 78 of "200 OK", and the mail transmission button 82 is operated. In this mail 94 also, as in the mail 90 shown in FIG. 10, the linking page in the linking relationship and the linked page are displayed. Then, occurrence of link breakage caused by page deletion is notified to ask the site manager to perform correction.

FIG. 14 is a flowchart illustrating details of a manager mail information acquiring processing of the external web site in step S5 shown in FIG. 3. This mail acquiring processing comprises the steps of reading in the access log file 28 of the web server 10 in step S1, extracting domain information of the counter-part for which link is set from the access log file 28 in step S2, and storing the same into a domain mail information file 48-1. Then in step S3, the domain storing the domain mail information file 48-1 is accessed to acquire an HTML source 96 as shown in FIG. 15. Then in step S4, an anchor tag 98 in the site is extracted from the HTML source 96 shown in FIG. 15, and the pages in the counter-part site are patrolled in step S5. In step S6, the mail anchor tag 100 of FIG. 15 is extracted to extract, from among mail addresses thereof, those satisfying the extraction conditions of the mail address of the manager of the web site, and stores the same in the mail information file 48-2. For example, from among the mail addresses, mail addresses having an ID usually used by a web site manager such as:

"admin@xx.xx.xx" and
"webmaster@xx.xx.xx"

are extracted in the case of a web site manager, and stored in the mail information file 48-2. As a result of the mail information acquiring processing of FIG. 15, domain information and mail information of the web site manager acquired during operation of the web server are used in the display of a link site name and a site manager mail address 76 of the information list 72 of the warning screen 70 of FIG. 9 and the warning screen 92 of FIG. 12, and employed for transmission of an electronic mail for requesting correction of a linking web page resulting from discovery of link breakage.

According to the present invention, as described above, a web site manager can easily grasp link breakage by issuing warning regarding link breakage resulting from page deletion through collation with the log, without the need to follow a complicated procedure such as artificial analysis of an access log, upon update of a web site. Even when link breakage occurs during operation, the web site manager can easily grasp it by detecting, for example, a "no-page" error code and issuing warning regarding link breakage. Furthermore, since mail information about managers of the other linked web sites is obtained through routine management upon issuance of link breakage warning, correction of the link breakage at the linking site can easily be asked to the manager thereof via a mail. It is not therefore necessary to search for the manager mail address of the link requester each time for correction of the link breakage, and it is possible to largely reduce the burden on the web site manager relative to link breakage. The above-mentioned embodiment has been described by means of the Apache already announced as a web server. The present invention is not limited to this, but the web server management of the present invention capable of discovering the correcting link breakage of an external web page is applicable to any web server in the same manner. The present invention provides also a program for web server management. The program has specifically a configuration of the flowchart of web management processing shown in FIG. 3, and has contents of flowcharts shown in FIGS. 4, 11 and 14, which are subroutines described as details thereof.

The present invention provides also a machine-readable recording medium storing the web server managing program. The recording media of the present invention include portable-type recording media such as a CD-ROM, a floppy disk (R), a DVD disk, a magneto-optical disk, and an IC card storage units provided in or outside a computer system such as a hard disk HDD, other computer systems and databases thereof, and transmission media on a line.

The present invention includes appropriate variants without impairing the object and advantages thereof, and is not limited by numerical values shown in the aforementioned embodiments.

What is claimed is:
1. A web server managing method, comprising:
acquiring log information resulting from an access from an external web site to HTTP contents from a web computer server;

generating refer information by extracting linking relationship between a target web page referred to by a referring page containing a link of the external web site from said acquired log information;
recognizing a possibility of occurrence of a link breakage caused by deletion of a page with reference to said refer information upon updating said HTTP contents, and
generating mail information by extracting a site manager mail address of the external web site having a linking relationship from the log information of said web server,
wherein when the link breakage is caused by the page deletion upon updating, transmitting an electronic mail for correction request of the external web site to the manager mail address selected from said mail information, and
wherein in the acquiring of log information, a log file of said web server and/or CGI environment variable is acquired, and in said generating of refer information, refer information is generated by extracting a linking relationship between the target web page and the external web site from said log file and/or the CGI environment variable.

2. A method according to claim 1, wherein:
the recognizing causes display of a warning screen containing a name of the external web site suffering from the link breakage, the site manager mail address, an operating button indicating a propriety of page deletion, and a mail transmitting button.

3. A method according to claim 2, wherein:
in the recognizing, said warning screen contains a site check button which checks presence or absence of a linking party's page in the external web site, and displays a result thereof.

4. A web server managing method, comprising:
acquiring log information resulting from an access from an external web site to HTTP contents from a web computer server;
generating link information by extracting, from said acquired log information, a linking relationship between a target web page referred to by a referring page containing a link of the external web site, and detecting a no-page error code;
warning upon detection of said no-page error code, of recognizing a web page suffering from a link breakage with reference to said link information, and issuing a warning to said effect; and
a generating mail information by extracting a site manager mail address of the external web site having the linking relationship from the log information of said web server,
wherein said warning comprises transmitting, when a no page error code is detected, an electronic mail for requesting correction of the external web site to the site manager mail address selected from said mail information, and
wherein said acquiring comprises acquiring a log file of said web server and/or a CGI environment variable, and
said generating comprises generating the link information by extracting the linking relationship between the target web page and the external web site from said log file and/or the CGI environment variable, and detecting an error code 404.

5. A method according to claim 4, wherein:
said warning comprises causing display of a warning screen having a name of the external web site suffering from the link breakage, the mail address of the site manager, and a mail transmitting button.

6. A method according to claim 5, wherein:
in said warning, said warning screen contains a site check button which checks presence or absence of a linking party's page in the external web site, and displays a result thereof.

7. A machine-readable recording medium storing a web server managing program causing a computer to execute:
acquiring log information resulting from an access from an external web site to HTTP contents from the web server;
generating refer information by extracting a linking relationship between a target web page referred to by a referring page containing a link of the external web site from said acquired log information;
generating mail information by extracting a site manager mail address of the external web site having the linking relationship from the log information of said web server; and
warning of recognizing a possibility of occurrence of a link breakage caused by deletion of a page with reference to said refer information upon updating said HTTP contents, and at a same time, transmitting an electronic mail for requesting correction of the external web site to the site manager mail address selected from said mail information,
wherein in the acquiring of log information, a log file of said web server and/or CGI environment variable is acquired, and in said generating of refer information, refer information is generated by extracting the linking relationship between the target web page and the external web site from said log file and/or the CGI environment variable.

8. A machine-readable recording medium storing a web server managing program causing a computer to execute:
acquiring log information resulting from an access from an external web site to HTTP contents from a web server;
generating link information by extracting, from said acquired log information, a linking relationship between a target web page referred to by a referring page containing a link of the external web site, and detecting a no-page code;
generating mail information by extracting a site manager mail address of the external web site having the linking relationship from the log information of said web server; and
warning, upon detection of said no-page error code, of recognizing a web page suffering from a link breakage with reference to said refer information to issue a warning thereto, and at a same time, transmitting an electronic mail to request correction of the target web site to the site manager mail address selected from said mail information,
wherein said acquiring comprises acquiring a log file of said web server and/or CGI environment variable, and
said generating comprises generating the link information by extracting the linking relationship between the target web page and the external web site from said log file and/or the CGI environment variable, and detecting an error code 404.

9. A machine-readable recording medium, storing a program causing a computer to execute:
acquiring log information resulting from an access from an external web site to HTTP contents from a web server;
generating refer information by extracting a linking relationship between a target web page referred to by a referring page containing a link of the external web site from said acquired log information;

generating mail information by extracting a site manager mail address of the external web site having the linking relationship from the log information of said web server; and recognizing a possibility of occurrence of a link breakage caused by deletion of a page with reference to said refer information upon updating said HTTP contents, and at a same time, transmitting an electronic mail for requesting correction of the external web site to the site manager mail address selected from said mail information, wherein in the acquiring of log information, a log file of said web server and/or CGI environment variable is acquired, and in said generating of refer information, refer information is generated by extracting the linking relationship between the target web page and the external web site from said log file and/or the CGI environment variable.

10. A machine-readable recording medium, storing a program causing a computer to execute:

acquiring log information resulting from an access from an external web site to HTTP contents from a web server;

generating link information by extracting a linking relationship between a target web page referred to by a referring page containing a link of the external web site from said acquired log information, and detecting a no-page error code;

generating mail information by extracting, from the log information of said web server, a site manager mail address of the external web site having the linking relationship; and recognizing, upon detection of said no-page error code, a web page suffering from link breakage with reference to said refer information to issue a warning, and transmitting an electronic mail to request correction of the external web site to said site manager mail address selected from said mail information, wherein said acquiring comprises acquiring a log file of said web server and/or a CGI environment variable, and said generating comprises generating the link information by extracting the linking relationship between the target web page and the external web site from said log file and/or CGI environment variable, and detecting an error code 404.

* * * * *